United States Patent
Maruko et al.

(10) Patent No.: US 10,610,979 B2
(45) Date of Patent: Apr. 7, 2020

(54) FLUX COMPOSITION FOR SOLDER APPLICATIONS

(71) Applicant: Senju Metal Industry Co., Ltd., Tokyo (JP)

(72) Inventors: Daisuke Maruko, Tochigi (JP); Atsumi Takahashi, Tochigi (JP); Hiroki Sudo, Tochigi (JP); Hiroyoshi Kawasaki, Tokyo (JP); Takahiro Hattori, Tochigi (JP); Takahiro Roppongi, Tochigi (JP); Daisuke Soma, Tochigi (JP); Takashi Hagiwara, Tochigi (JP); Isamu Sato, Saitama (JP); Yuji Kawamata, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 7 days.

(21) Appl. No.: 15/988,257

(22) Filed: May 24, 2018

(65) Prior Publication Data

US 2018/0339375 A1    Nov. 29, 2018

(30) Foreign Application Priority Data

May 25, 2017    (JP) ................................ 2017-103254

(51) Int. Cl.
*B23K 35/36* (2006.01)
*B23K 35/26* (2006.01)
*B23K 35/362* (2006.01)

(52) U.S. Cl.
CPC .......... *B23K 35/3613* (2013.01); *B23K 35/26* (2013.01); *B23K 35/262* (2013.01); *B23K 35/362* (2013.01); *B23K 35/3612* (2013.01); *B23K 35/3615* (2013.01); *B23K 35/3616* (2013.01); *B23K 35/3618* (2013.01)

(58) Field of Classification Search
CPC .. B23K 35/3613; B23K 35/26; B23K 35/262; B23K 35/3612; B23K 35/3615; B23K 35/3616; B23K 35/3618; B23K 35/362
See application file for complete search history.

(56) References Cited

U.S. PATENT DOCUMENTS

| | | | | |
|---|---|---|---|---|
| 6,059,894 | A | | 5/2000 | Pendse |
| 6,159,304 | A | * | 12/2000 | Noguchi ............. B23K 35/025 148/23 |
| 6,752,309 | B1 | * | 6/2004 | Parhar ............... B23K 35/3612 148/23 |
| 2003/0060043 | A1 | | 3/2003 | Hosomi et al. |
| 2008/0156852 | A1 | * | 7/2008 | Prakash ............ B23K 35/3613 228/256 |
| 2009/0308496 | A1 | * | 12/2009 | Kawamata .......... B23K 35/262 148/24 |

FOREIGN PATENT DOCUMENTS

| | | |
|---|---|---|
| CN | 101073862 A | 11/2007 |
| CN | 101204762 A | 6/2008 |
| CN | 101557903 A | 10/2009 |
| CN | 103286477 A | 9/2013 |
| CN | 104416299 A | 3/2015 |
| CN | 104858571 | 8/2015 |
| CN | 104858571 A | 8/2015 |
| JP | 542389 A | 2/1993 |
| JP | 2004501765 A | 1/2004 |
| WO | 0147660 A1 | 7/2001 |

OTHER PUBLICATIONS

"PSR-4000 G24K Material Safety Data Sheet", Jul. 1, 2011, 8 pages, http://www.taiyo-hd.co.jp/_cms/wp-content/uploads/2016/02/MPSR4000G24K_CA40G24_E.pdf., Taiyo Ink Mfg. Co., Ltd.

* cited by examiner

*Primary Examiner* — Anthony J Zimmer
*Assistant Examiner* — Ricardo D Morales
(74) *Attorney, Agent, or Firm* — The Webb Law Firm

(57) ABSTRACT

Provided is a flux containing not less than 11.0 degrees and not more than 17.0 of a contact angle between the flux and a resist substrate on which the flux has been printed to have 1.0 mm of a diameter and 0.15 mm of a thickness when heating the resist substrate at 150 degrees C. for 30 seconds and cooling the resist substrate to a room temperature. The flux also contains more than zero seconds and not more than 2.0 seconds of a zero-cross time when heating a Cu plate at 150 degrees C. in a thermostat oven for 12 hours, applying the flux onto the baked Cu plate, and dipping the baked Cu plate onto which the flux is applied into a Sn-3.0Ag-0.5Cu alloy at a dipping speed of 15 mm/sec and by 2.0 mm of a dipped depth.

2 Claims, No Drawings

FLUX COMPOSITION FOR SOLDER APPLICATIONS

CROSS REFERENCE TO RELATED APPLICATION

This application claims priority to Japanese Patent Application No. 2017-103254 filed May 25, 2017, the disclosure of which is hereby incorporated in its entirety by reference.

BACKGROUND

Technical Field

The present invention relates to a flux containing a surfactant.

Related Art

In general, a flux using for soldering has chemically removed metal oxides from a surface of a solder alloy and a metal surface of an object to be soldered to enable metal elements to be transferred through a boundary of both surfaces. For this reason, intermetallic compounds have formed between the surface of the solder alloy and the metal surface of the object to be soldered by soldering using the flux, thereby enabling a strong join to be obtained.

In recent years, along with miniaturization of electronic components to be soldered using the flux, the electrode pitches, which are parts to be soldered of each of the electronic components, have been increasingly narrowed. When forming a solder bump on a narrowed electrode, a metal core column in which a metal core having a column shape is covered by solder has gradually been used in place of a solder ball.

The following will describe a common method of mounting the metal core columns on the electrodes. A flux is first applied onto electrodes of a substrate, which is not shown in a drawing. A mounting jig is next set on the substrate in order to mount the metal core columns on the electrodes. The metal core columns are passed through-holes pierced in the mounting jig to allow the metal core columns to be vertically mounted in the flux on the electrodes. While maintaining this state, the substrate enters into a heating apparatus such as a reflow furnace to heat the substrate. The solder of the surface of each metal core column and the flux applied onto each electrode of the substrate melt to solder the substrate and the metal core column, thereby forming the solder bump.

When it is insufficient to wetly spread out the flux in a case of mounting the metal core columns on the substrate, it is insufficiently possible to remove an oxide film, so that the solder spreads only to an oxide-film-removed portion and does not evenly spread. When the solder does not evenly spread, the metal core columns may fall down or deviate and it may be impossible to form the solder bump on a desired position of the electrode. When the solder bump is not formed on the desired position of the electrode, there may become a factor such as a conduction failure in deteriorating reliability of the soldering.

It is generally known that when a flux contains a surfactant, it is easy for the flux to wetly spread out because surface tension of the flux reduces. As an example of the flux containing the surfactant, Japanese Patent Application Publication No. H05-42389 discloses a flux composition containing a rosin-ester based surfactant or an amide-based surfactant. Japanese Patent Application Publication No. 2004-501765 discloses a flux for brazing containing a cation surfactant and a nonionic surfactant.

SUMMARY

However, when a flux applied onto the electrode has too reduced surface tension to excessively spread out, the metal core column deviates together with the wet spreading-out of the flux, so that it may be impossible to form the solder bump on a desired position of the electrode.

In a past flux, as described above, the metal core column deviates even when the flux contains a surfactant in both cases where the surface tension of the flux is too high or low. Therefore, it may be difficult to form the solder bump on a desired position of the electrode. Nothing about the issue has been taken into consideration in relation to the fluxes disclosed in these Japanese Patent Application Publications.

This invention addresses the above-mentioned issue and has an object to provide a flux which preferably forms a solder bump by the metal core column on a desired position of the electrode.

To achieve the above-mentioned object, a flux in this invention is a flux containing 11.0 degrees or more and 17.0 degrees or less of a contact angle between the flux and a resist substrate on which the flux has been printed to have 1.0 mm of a diameter and 0.15 mm of a thickness when heating the resist substrate at 150 degrees C. for 30 seconds and cooling the resist substrate to a room temperature; and more than zero seconds and not more than 2.0 seconds of a zero-cross time when heating a Cu plate at 150 degrees C. in a thermostat oven for 12 hours, applying the flux onto the baked Cu plate, and dipping the baked Cu plate onto which the flux has been applied into a Sn-3.0Ag-0.5Cu alloy at a dipping speed of 15 mm/sec and by 2.0 mm of a dipped depth.

It is desirable to provide the flux further containing at least 13% by mass or more and 40% by mass or less of an amine, and 1% by mass or more and 15% by mass or less of a surfactant, wherein the amine has 700 or less of a molecular weight and the surfactant has more than 700 of the molecular weight.

It is also desirable to provide the flux further containing 5% by mass or more and 30% by mass or less of an organic acid, 13% by mass or more and 40% by mass or less of an amine, 1% by mass or more and 15% by mass or less of a surfactant, 10% by mass or more and 30% by mass or less of a base agent, and 10% by mass or more and 40% by mass or less of a solvent, wherein the amine has 700 or less of a molecular weight and the surfactant has more than 700 of the molecular weight.

It is further desirable to provide the flux wherein the amine is at least any one selected from a group consisting of imidazoles, aliphatic amine, aromatic amine, aminoalcohol, polyoxyalkylene alkylamine, terminal amine polyoxyalkylene, amine halogenated hydroacid salt, and polyoxyalkylene amine.

It is still further desirable to provide the flux wherein the surfactant is any one selected from a group consisting of polyoxyalkylene alkylamine surfactant, polyoxyalkylene alkylenediamine surfactant, and polyoxyalkylene alkylenetriamine surfactant.

The flux of the present invention may present preferably wet-spreading properties and may form the solder bump by the metal core column on a desired position of the electrode on the substrate.

The concluding portion of this specification particularly points out and directly claims the subject matter of the present invention. However, those skilled in the art will best understand both the organization and method of operation of the invention, together with further advantages and objects thereof, by reading the remaining portions of the specification.

DETAILED DESCRIPTION

The following will describe a flux according to an embodiment of the present invention. The present invention is not limited to the following specific examples.

Examples of Flux Composition

The flux of the present embodiment contains 11.0 degrees or more and 17.0 degrees or less of a contact angle between the flux and a resist substrate on which the flux has been printed to have 1.0 mm of a diameter and 0.15 mm of a thickness when heating the resist substrate at 150 degrees C. for 30 seconds and cooling the resist substrate to a room temperature. The flux of the present embodiment also contains more than zero seconds and not more than 2.0 seconds of a zero-cross time when heating a Cu plate at 150 degrees C. in a thermostat oven for 12 hours, applying the flux onto the baked Cu plate, and dipping the baked Cu plate onto which the flux has been applied into a Sn-3.0Ag-0.5Cu alloy (Eco Solder M705 made by Senju Metal Industry Co., LTD) at a dipping speed of 15 mm/sec and by 2.0 mm of a dipped depth.

The flux of the present embodiment preferably contains an amine and a surfactant. The flux preferably contains 13% by mass or more and 40% by mass or less of the amine and 1% by mass or more and 15% by mass or less of the surfactant. The flux also preferably contains 5% by mass or more and 30% by mass or less of an organic acid, 13% by mass or more and 40% by mass or less of an amine, 1% by mass or more and 15% by mass or less of a surfactant, 10% by mass or more and 30% by mass or less of a base agent, and 10% by mass or more and 40% by mass or less of a solvent.

The organic acid is added to the flux as an activator component. As the organic acid, glutaric acid, phenyl succinic acid, succinic acid, malonic acid, adipic acid, azelaic acid, glycolic acid, diglycolic acid, thioglycolic acid, thiodiglycolic acid, propionic acid, malic acid, tartaric acid, dimer acid, hydrogenated dimer acid, trimer acid or the like is used.

The amine is added to the flux as an active auxiliary component to affect a speed when the flux wetly spreads out. The amine preferably has 700 or less of a molecular weight, more preferably, 600 or less of a molecular weight. As the amine, for example, at least any one of imidazoles, aliphatic amine, aromatic amine, aminoalcohol, polyoxyalkylene alkylamine, terminal amine polyoxyalkylene, amine halogenated hydroacid salt and polyoxyalkylene amine is used.

As the imidazoles, imidazole, 2-methylimidazole, 2-ethyl-4-methylimidazole, 1-benzil-2-phenylimidazole or the like is exemplified.

As the aliphatic amine, methyl amine, ethyl amine, dimethyl amine, 1-aminopropane, isopropylamine, trimethylamine, n-ethyl methylamine, allylamine, n-butylamine, diethylamine, sec-butylamine, tert-butylamine, N,N-dimethyl ethylamine, isobutylamine, pyrrolidine, 3-pyrroline, n-pentylamine, dimethylaminopropane, 1-aminohexan, triethylamine, diisopropylamine, dipropylamine, hexamethyleneimine, 1-methylpiperidine, 2-methylpiperidine, 4-methylpiperidine, cyclohexylamine, diallylamine, n-octyl amine, aminomethylcyclohexane, 2-ethylhexylamine, dibutylamine, diisobutylamine, 1,1,3,3-tetramethylbutylamine, 1-cyclohexylethylamine, N,N-dimethylcyclohexylamine or the like is exemplified.

As the aromatic amine, aniline, diethylaniline, pyridine, diphenylguanidine, ditolylguanidine or the like is exemplified.

As the aminoalcohol, 2-ethylamino ethanol, diethanolamine, diisopropanolamine, N-butyl diethanolamine, triisopropanolamine, N,N-bis(2-hydroxyethyl)-N-cyclohexyl amine, triethanol amine, N,N,N',N'-tetrakis(2-hydroxypropyl)ethylenediamine, N,N,N',N'',N'''-pentakis(2-hydrokypropyl)diethylenetriamine or the like is exemplified.

As the polyoxyalkylene alkylamine, polyoxyalkylene alkylamine, polyoxyalkylene ethylenediamine, polyoxyalkylene diethylenetriamine or the like is exemplified.

As the terminal amine polyoxyalkylene, amino terminal polyethylene glycol (PEG)/Polypropylene glycol (PPG) copolymer, tetraoxypropylene ethylenediamine or the like is exemplified.

As the amine halogenated hydroacid salt, halogenated hydroacid salt (hydrofluoric acid salt, fluoroboric acid salt, hydrochloric acid salt, hydrobromic acid salt or hydriodic acid salt) of various kinds of the above-mentioned amines is exemplified. For example, ethylamine hydrochloride, ethylamine hydrobromide, cyclohexylamine hydrochloride, cyclohexylamine hydrobromide or the like is exemplified.

The surfactant is added to the flux as a component for adjusting surface tension of the flux. The surfactant has more than 700 of the molecular weight. As the surfactant, at least any one of polyoxyalkylene alkylamine surfactant, polyoxyalkylene alkylenediamine surfactant, and polyoxyalkylene alkylenetriamine surfactant is preferably used. For example, the surfactant includes polyoxyethylene ethylenediamine, polyoxypropylene ethylenediamine, polyoxyethylene polyoxypropylene ethylenediamine, polyoxyethylene alkylamine, polyoxyethylene tallowamine, polyoxyethylene alkylpropyldiamine, polyoxyethylene tallowpropylenediamine, polyoxyethylene alkylether, polyoxyethylene alkylamide, and ethylene oxide adduct of fatty alcohol.

As the base agent, polyethylene glycol, PEG/PPG copolymer, polyoxyethylene alkyl ester and/or polyoxyethylene tallowester is/are used.

As the solvent, a generally-known glycol ether based compound and a generally-known alcohol based compound may be used. It is preferable that the solvent does not volatilize at a low-temperature range of 120 degrees C. and 150 degrees C., in order to allow the activator to efficiently act. This is because when the solvent volatilizes, fluidity of the flux deteriorates so that it may be difficult to wetly spread out the flux to a portion to be joined. Accordingly, the solvent preferably has 200 degrees C. or more of a boiling point. Further, it is preferable that the solvent which is volatilized at a reflow temperature is used. The solvent also preferably has 280 degrees C. or less of a boiling point. As the solvent, hexylene glycol, hexyl diglycol, 1,3-butanediol, 2-ethyl-1,3-hexanediol, 2-ethyl hexyl diglycol, phenyl glycol, butyl triglycol, terpineol or the like is used.

As additive to the flux other than the above-mentioned ones, 0% by mass or more and 5% by mass or less of halogen may be contained. For example, the halogen includes trans-2,3-dibromo-2-butene-1,4-diol, 2,3-dibromo-1,4-butendiol, 2,3-dibromo-1-propanol, 2,3-dichloro-1-propanol, 2,2,2-tribromoethanol, and 1,1,2,2-tetrabromoethane. Further, a coloring agent such as a coloring matter, a pigment, and a dye, an antifoam and/or the like may be suitably added to the flux within limits that do not impair any function of the flux.

Executed Examples

The following will describe specific executed examples of the flux according to the present invention, but the present invention is not limited to the following specific executed examples. The values without unit in the following tables represent % by mass.

Regarding Tables 1 and 2

The fluxes of each executed example and each comparison example, which had components shown in Tables 1 and 2, were first prepared. In order to determine the components contained in the fluxes having excellent wet-spreading properties, the prepared fluxes were subjected to the validation about a contact angle between the flux and the resist substrate and the validation about a zero-cross time with Wetting Balance Method as follows.

(I) Validation of Contact Angle (A) Evaluation Method

After the fluxes of each Executed Example and each Comparison Example had been printed on different resist substrates to have 1.0 mm of a diameter and 0.15 mm of a thickness, each resist substrate on which the flux had been printed was heated at 150 degrees C. for 30 seconds and was cooled to a room temperature. PSR-4000 G24K made by TAIYO INK MFG. CO., LTD. was used as the resist substrates and a contact angle meter, DROP MASTER 700, made by KYOWA INTERFACE SCIENCE CO., Ltd. measured the contact angle between the cooled fluxes and the resist substrates.

(B) Evaluation Criterion

It is possible to determine whether the flux wetly spreads out broadly or narrowly based on the contact angle between the applied flux and the resist substrate. It may be determined that the smaller the flux has a contact angle, the broader the flux wetly spreads out; and the larger the flux has a contact angle, the narrower the flux wetly spreads out. Even if the flux wetly spreads out too broadly or narrowly, a metal core column falls down or deviates so that a solder bump cannot be formed at a desired position. These conditions indicate poor wet-spreading properties. If the contact angle stays within a predetermined range, the flux has excellent wet-spreading properties and can form a solder bump by the metal core column at a desired position. The inventors of this invention found that the flux having 11.0 degrees or more and 17.0 degrees or less of a contact angle had excellent wet-spreading properties. The flux having less than 11.0 degrees of the contact angle spread out too broadly and even when the metal core column was soldered, it was impossible to form a solder bump at a desired position. The flux having more than 17.0 degrees of the contact angle insufficiently spread out and even when the metal core column was soldered, it was impossible to form a solder bump at a desired position.

(II) Validation of Zero-Cross Time with Wetting Balance Method (A) Evaluation Method Cu plates each having a thickness of 0.3 mm and a dimension of 30.0 mm×5.0 mm, were heated at 150 degrees C. in a thermostat oven for 12 hours to prepare the baked Cu plates. The flux was applied onto a surface of each baked Cu plate. Tests were performed using a solder checker, SAT-5100 made by RHESCA Corporation. In the tests, by dipping the baked Cu plates into a Sn-3.0Ag-0.5Cu alloy (Eco Solder M705 made by Senju Metal Industry Co., LTD) heated to 250 degrees C. and kept to this temperature at a dipping speed of 15 mm/sec and by 2.0 mm of a dipped depth to obtain their wet curves. Their zero-cross times were validated from the obtained wet curves. Such evaluations were respectively performed on the fluxes of the executed examples and the comparison examples.

(B) Evaluation Criterion

It is possible to determine a speed when the flux wetly spreads out. It may be determined that the faster the flux has a zero-cross time, the rapider the flux spreads out, which indicates excellent wet-spreading properties; and the slower the flux has a zero-cross time, the slower the flux spreads out, which indicates insufficient wet-spreading properties. The inventors of this invention found that the flux having more than zero seconds and not more than 2.0 seconds of the zero-cross time indicated excellent wet-spreading properties. The flux having more than 2.0 seconds of the zero-cross time spread out slowly, which indicated insufficient wet-spreading properties. When using the flux which indicated insufficient wet-spreading properties in the soldering, any failure such as joining defect may be easy to occur in the soldering but when using the flux which indicated excellent wet-spreading properties in the soldering, any failure may be hard to occur in the soldering.

TABLE 1

| | EXECUTED EXAMPLE 1 | EXECUTED EXAMPLE 2 | EXECUTED EXAMPLE 3 | EXECUTED EXAMPLE 4 | EXECUTED EXAMPLE 5 | EXECUTED EXAMPLE 6 | EXECUTED EXAMPLE 7 | EXECUTED EXAMPLE 8 | EXECUTED EXAMPLE 9 | EXECUTED EXAMPLE 10 | EXECUTED EXAMPLE 11 |
|---|---|---|---|---|---|---|---|---|---|---|---|
| ORGANIC ACID | 20 | 20 | 20 | 20 | 20 | 20 | 10 | 10 | 10 | 10 | 10 |
| AMINE IMIDAZOLE | 3 | 3 | 3 | 3 | 3 | 3 | 3 | 3 | 3 | 3 | 3 |
| 2-METHYLIMIDAZOLE | | | 3 | | | | | | | | |
| DIETHANOLAMINE | | 7 | | | | | | | | | |
| N,N',N'-TETRAKIS (2-HYDROXYPROPYL) ETHYLENEDIAMINE | | | | | | | 10 | 10 | 10 | 10 | 10 |
| N,N',N'',N'''-PENTAKIS (2-HYDROXYPROPYL) DIETHYLENETRIAMINE | 20 | 20 | 20 | 20 | 20 | 20 | | | | | |
| ETHYLAMINE HYDROCHLORIDE | | | | 3 | | | | | | | |
| ETHYLAMINE HYDROBROMIDE | | | | | 3 | | | | | 5 | |
| CYCLOHEXYLAMINE HYDROBROMIDE | | | | | | 3 | | | | | |
| AMINO-TERMINAL PEG/PPG COPOLYMER | 7 | | 7 | 7 | 7 | 7 | | | | | 5 |
| HALOGEN TRANS-2,3-DIBROMO-2-BUTENE-1,4-DIOL | | | | | | | | | 5 | | |
| SURFACTANT POLYOXYETHYLENE POLYOXYPROPYLENE ETHYLENEDIAMINE | | | | | | | | | | | |
| POLYOXYETHYLENE ALKYLAMINE | 3 | 3 | 3 | 3 | 3 | 3 | 10 | 15 | 10 | 10 | 10 |
| POLYOXYETHYLENE ALKYLAMIDE | | | | | | | | | | | |
| BASE AGENT POLYETHYLENE GLYCOL | 15 | 15 | 15 | 15 | 15 | 15 | 30 | 25 | 25 | 25 | 25 |
| SOLVENT | 32 | 32 | 32 | 32 | 32 | 32 | 37 | 37 | 37 | 37 | 37 |
| CONTACT ANGLE | 12.2 | 12.9 | 12.1 | 12.7 | 12.3 | 13.1 | 11.8 | 12.0 | 11.0 | 11.3 | 11.1 |
| ZERO-CROSS TIME | 1.12 | 1.05 | 1.10 | 1.08 | 1.15 | 1.29 | 1.08 | 1.08 | 1.08 | 1.02 | 1.03 |
| OVERALL EVALUATION | ○ | ○ | ○ | ○ | ○ | ○ | ○ | ○ | ○ | ○ | ○ |

TABLE 2

| | | EXECUTED EXAMPLE 12 | EXECUTED EXAMPLE 13 | EXECUTED EXAMPLE 14 | EXECUTED EXAMPLE 15 | EXECUTED EXAMPLE 16 | EXECUTED EXAMPLE 17 | EXECUTED EXAMPLE 18 |
|---|---|---|---|---|---|---|---|---|
| | ORGANIC ACID | 10 | 20 | 20 | 20 | 5 | 30 | 19 |
| AMINE | IMIDAZOLE | 3 | 3 | 1 | 3 | 8 | 3 | |
| | 2-METHYLIMIDAZOLE | | | | | | | |
| | DIETHANOL AMINE | | | | | | | |
| | N,N,N',N'-TETRAKIS(2-HYDROXYPROPYL)ETHYLENEDIAMINE | 5 | | | | | | 20 |
| | N,N,N',N'',N''-PENTAKIS(2-HYDROXYPROPYL)DIETHYLENETRIAMINE | | 20 | 20 | 20 | 20 | 20 | 20 |
| | ETHYLAMINE | | | | | | | |
| | ETHYLAMINE | | | | | | | |
| | CYCLOHEXYLAMINE HYDROBROMIDE | | | | | | | |
| | AMINOTERMINAL PEG/PPG COPOLYMER | 10 | 7 | 7 | 7 | 12 | 7 | |
| HALOGEN | TRANS-2,3-DIBROMO-2-BUTENE-1,4-DIOL | | | | | | | |
| SURFACTANT | POLYOXYETHYLENE POLYOXYPROPYLENE ETHYLENEDIAMINE | 10 | | | | | | |
| | POLYOXYETHYLENE ALKYLAMINE | | 5 | 5 | 1 | 3 | 1 | 1 |
| | POLYOXYETHYLENE ALKYLAMIDE | | | | | | | |
| BASE AGENT | POLYETHYLENE GLYCOL | 30 | 15 | 15 | 15 | 12 | 29 | 10 |
| | SOLVENT | 32 | 30 | 32 | 34 | 40 | 10 | 30 |
| | CONTACT ANGLE | 13.8 | 11.0 | 11.1 | 16.0 | 13.3 | 15.8 | 11.2 |
| | ZERO-CROSS TIME | 1.10 | 1.10 | 2.00 | 1.14 | 1.02 | 1.09 | 1.96 |
| | OVERALL EVALUATION | ○ | ○ | ○ | ○ | ○ | ○ | ○ |

| | | COMPARISON EXAMPLE 1 | COMPARISON EXAMPLE 2 | COMPARISON EXAMPLE 3 | COMPARISON EXAMPLE 4 | COMPARISON EXAMPLE 5 | COMPARISON EXAMPLE 6 | COMPARISON EXAMPLE 7 |
|---|---|---|---|---|---|---|---|---|
| | ORGANIC ACID | 5 | 20 | 20 | 7 | 10 | 10 | 7 |
| AMINE | | | | | 3 | 1 | 3 | |
| | 2-METHYLIMIDAZOLE | | | | | | | |
| | DIETHANOL AMINE | | | | | | | |
| | N,N,N',N'-TETRAKIS(2-HYDROXYPROPYL)ETHYLENEDIAMINE | | | | | | 10 | |
| | N,N,N',N'',N''-PENTAKIS(2-HYDROXYPROPYL)DIETHYLENETRIAMINE | | 20 | 10 | | | | |
| | ETHYLAMINE | | | | | | | |
| | ETHYLAMINE | | | | | | | |

TABLE 2-continued

| | | | | | | | | |
|---|---|---|---|---|---|---|---|---|
| | CYCLOHEXYLAMINE HYDROBROMIDE | 14 | 10 | 11 | 10 | | | 11 |
| | AMINOTERMINAL PEG/PPG COPOLYMER | | | | | | | |
| HALOGEN | TRANS-2,3-DIBROMO-2-BUTENE-1,4-DIOL | | | | | | | |
| SURFACTANT | POLYOXYETHYLENE POLYOXYPROPYLENE ETHYLENEDIAMINE | 30 | | | | | | |
| | POLYOXYETHYLENE ALKYLAMINE | | | 20 | | | 10 | |
| | POLYOXYETHYLENE ALKYLAMIDE | | 20 | | | | | |
| BASE AGENT | POLYETHYLENE GLYCOL | 20 | 12 | 10 | 13 | 30 | 30 | 13 |
| | SOLVENT | 31 | 28 | 30 | 69 | 47 | 39 | 66 |
| | CONTACT ANGLE | 15.1 | 9.0 | 10.2 | 26.0 | 17.2 | 11.5 | 27.0 |
| | ZERO-CROSS TIME | 5.23 | 2.33 | 1.68 | 2.76 | 1.10 | 2.40 | 1.10 |
| | OVERALL EVALUATION | x | x | x | x | x | x | x |

The flux of the Executed Example 1 contained 20% by mass of an organic acid, 3% by mass of imidazole as amine, 20% by mass of N,N,N',N'',N''-pentakis(2-hydrokypropyl)diethylenetriamine as the amine, 7% by mass of amino terminal PEG/PPG copolymer as the amine, 3% by mass of polyoxyethylene alkylamine as a surfactant, 15% by mass of polyethylene glycol as a base agent and 32% by mass of a solvent. The flux of the Executed Example 1 indicated 12.2 degrees of the contact angle and 1.12 seconds of the zero-cross time and both obtained results were excellent.

The flux of the Executed Example 2 contained 20% by mass of an organic acid, 3% by mass of imidazole, 7% by mass of diethanolamine as an amine, 20% by mass of N,N,N',N'',N''-pentakis(2-hydrokypropyl)diethylenetriamine as the amine, 3% by mass of polyoxyethylene alkylamine as a surfactant, 15% by mass of polyethylene glycol as a base agent and 32% by mass of a solvent. The flux of the Executed Example 2 indicated 12.9 degrees of the contact angle and 1.05 seconds of the zero-cross time and both obtained results were excellent.

The flux of the Executed Example 3 contained 20% by mass of an organic acid, 3% by mass of 2-methylimidazole as an amine, 20% by mass of N,N,N',N'',N''-pentakis(2-hydrokypropyl)diethylenetriamine as the amine, 7% by mass of amino terminal PEG/PPG copolymer as the amine, 3% by mass of polyoxyethylene alkylamine as a surfactant, 15% by mass of polyethylene glycol as a base agent and 32% by mass of a solvent. The flux of the Executed Example 3 indicated 12.1 degrees of the contact angle and 1.10 seconds of the zero-cross time and both obtained results were excellent.

The flux of the Executed Example 4 contained 20% by mass of an organic acid, 20% by mass of N,N,N',N'',N''-pentakis(2-hydrokypropyl)diethylenetriamine as an amine, 3% by mass of ethylamine hydrochloride as the amine, 7% by mass of amino terminal PEG/PPG copolymer as the amine, 3% by mass of polyoxyethylene alkylamine as a surfactant, 15% by mass of polyethylene glycol as a base agent and 32% by mass of a solvent. The flux of the Executed Example 4 indicated 12.7 degrees of the contact angle and 1.08 seconds of the zero-cross time and both obtained results were excellent.

The flux of the Executed Example 5 contained 20% by mass of an organic acid, 20% by mass of N,N,N',N'',N''-pentakis(2-hydrokypropyl)diethylenetriamine as an amine, 3% by mass of ethylamine hydrobromide as the amine, 7% by mass of amino terminal PEG/PPG copolymer as the amine, 3% by mass of polyoxyethylene alkylamine as a surfactant, 15% by mass of polyethylene glycol as a base agent and 32% by mass of a solvent. The flux of the Executed Example 5 indicated 12.3 degrees of the contact angle and 1.15 seconds of the zero-cross time and both obtained results were excellent.

The flux of the Executed Example 6 contained 20% by mass of an organic acid, 20% by mass of N,N,N',N'',N''-pentakis(2-hydrokypropyl)diethylenetriamine as an amine, 3% by mass of cyclohexylamine hydrobromide as the amine, 7% by mass of amino terminal PEG/PPG copolymer as the amine, 3% by mass of polyoxyethylene alkylamine as a surfactant, 15% by mass of polyethylene glycol as a base agent and 32% by mass of a solvent. The flux of the Executed Example 6 indicated 13.1 degrees of the contact angle and 1.29 seconds of the zero-cross time and both obtained results were excellent.

The flux of the Executed Example 7 contained 10% by mass of an organic acid, 3% by mass of imidazole as an amine, 10% by mass of N,N,N',N'-tetrakis(2-hydroxypropyl)ethylenediamine as the amine, 10% by mass of polyoxyethylene alkylamine as a surfactant, 30% by mass of polyethylene glycol as a base agent and 37% by mass of a solvent. The flux of the Executed Example 7 indicated 11.8 degrees of the contact angle and 1.08 seconds of the zero-cross time and both obtained results were excellent.

The flux of the Executed Example 8 contained 10% by mass of an organic acid, 3% by mass of imidazole as an amine, 10% by mass of N,N,N',N'-tetrakis(2-hydroxypropyl)ethylenediamine as the amine, 15% by mass of polyoxyethylene alkylamine as a surfactant, 25% by mass of polyethylene glycol as a base agent and 37% by mass of a solvent. The flux of the Executed Example 8 indicated 12.0 degrees of the contact angle and 1.08 seconds of the zero-cross time and both obtained results were excellent.

The flux of the Executed Example 9 contained 10% by mass of an organic acid, 3% by mass of imidazole as an amine, 10% by mass of N,N,N',N'-tetrakis(2-hydroxypropyl)ethylenediamine as the amine, 5% by mass of trans-2,3-dibromo-2-butene-1,4-diol as halogen, 10% by mass of polyoxyethylene alkylamine as a surfactant, 25% by mass of polyethylene glycol as a base agent and 37% by mass of a solvent. The flux of the Executed Example 9 indicated 11.0 degrees of the contact angle and 1.08 seconds of the zero-cross time and both obtained results were excellent.

The flux of the Executed Example 10 contained 10% by mass of an organic acid, 3% by mass of imidazole as an amine, 10% by mass of N,N,N',N'-tetrakis(2-hydroxypropyl)ethylenediamine as the amine, 5% by mass of ethylamine hydrochloride as the amine, 10% by mass of polyoxyethylene alkylamine as a surfactant, 25% by mass of polyethylene glycol as a base agent and 37% by mass of a solvent. The flux of the Executed Example 10 indicated 11.3 degrees of the contact angle and 1.02 seconds of the zero-cross time and both obtained results were excellent.

The flux of the Executed Example 11 contained 10% by mass of an organic acid, 3% by mass of imidazole as an amine, 10% by mass of N,N,N',N'-tetrakis(2-hydroxypropyl)ethylenediamine as the amine, 5% by mass of ethylamine hydrobromide as the amine, 10% by mass of polyoxyethylene alkylamine as a surfactant, 25% by mass of polyethylene glycol as a base agent and 37% by mass of a solvent. The flux of the Executed Example 11 indicated 11.1 degrees of the contact angle and 1.03 seconds of the zero-cross time and both obtained results were excellent.

The flux of the Executed Example 12 contained 10% by mass of an organic acid, 3% by mass of imidazole as an amine, 5% by mass of N,N,N',N'-tetrakis(2-hydroxypropyl)ethylenediamine as the amine, 10% by mass of amino terminal PEG/PPG copolymer as the amine, 10% by mass of polyoxyethylene polyoxypropylene ethylenediamine as a surfactant, 30% by mass of polyethylene glycol as a base agent and 32% by mass of a solvent. The flux of the Executed Example 12 indicated 13.8 degrees of the contact angle and 1.10 seconds of the zero-cross time and both obtained results were excellent.

The flux of the Executed Example 13 contained 20% by mass of an organic acid, 3% by mass of imidazole as an amine, 20% by mass of N,N,N',N'',N''-pentakis(2-hydrokypropyl)diethylenetriamine as the amine, 7% by mass of amino terminal PEG/PPG copolymer as the amine, 5% by mass of polyoxyethylene alkylamine as a surfactant, 15% by mass of polyethylene glycol as a base agent and 30% by mass of a solvent. The flux of the Executed Example 13 indicated 11.0 degrees of the contact angle and 1.10 seconds of the zero-cross time and both obtained results were excellent.

The flux of the Executed Example 14 contained 20% by mass of an organic acid, 1% by mass of imidazole as an amine, 20% by mass of N,N,N',N'',N''-pentakis(2-hydrokypropyl)diethylenetriamine as the amine, 7% by mass of amino terminal PEG/PPG copolymer as the amine, 5% by mass of polyoxyethylene alkylamine as a surfactant, 15% by mass of polyethylene glycol as a base agent and 32% by mass of a solvent. The flux of the Executed Example 14 indicated 11.1 degrees of the contact angle and 2.00 seconds of the zero-cross time and both obtained results were excellent.

The flux of the Executed Example 15 contained 20% by mass of an organic acid, 3% by mass of imidazole as an amine, 20% by mass of N,N,N',N'',N''-pentakis(2-hydrokypropyl)diethylenetriamine as the amine, 7% by mass of amino terminal PEG/PPG copolymer as the amine, 1% by mass of polyoxyethylene alkylamine as a surfactant, 15% by mass of polyethylene glycol as a base agent and 34% by mass of a solvent. The flux of the Executed Example 15 indicated 16.0 degrees of the contact angle and 1.14 seconds of the zero-cross time and both obtained results were excellent.

The flux of the Executed Example 16 contained 5% by mass of an organic acid, 8% by mass of imidazole as an amine, 20% by mass of N,N,N',N'',N''-pentakis(2-hydrokypropyl)diethylenetriamine as the amine, 12% by mass of amino terminal PEG/PPG copolymer as the amine, 3% by mass of polyoxyethylene alkylamine as a surfactant, 12% by mass of polyethylene glycol as a base agent and 40% by mass of a solvent. The flux of the Executed Example 16 indicated 13.3 degrees of the contact angle and 1.02 seconds of the zero-cross time and both obtained results were excellent.

The flux of the Executed Example 17 contained 30% by mass of an organic acid, 3% by mass of imidazole as an amine, 20% by mass of N,N,N',N'',N''-pentakis(2-hydrokypropyl)diethylenetriamine as the amine, 7% by mass of amino terminal PEG/PPG copolymer as the amine, 1% by mass of polyoxyethylene alkylamine as a surfactant, 29% by mass of polyethylene glycol as a base agent and 10% by mass of a solvent. The flux of the Executed Example 17 indicated 15.8 degrees of the contact angle and 1.09 seconds of the zero-cross time and both obtained results were excellent.

The flux of the Executed Example 18 contained 19% by mass of an organic acid, 20% by mass of N,N,N',N'-tetrakis(2-hydroxypropyl)ethylenediamine as the amine, 20% by mass of N,N,N',N'',N''-pentakis(2-hydroxypropyl)diethylenetriamine as the amine, 1% by mass of polyoxyethylene alkylamine as a surfactant, 10% by mass of polyethylene glycol as a base agent and 30% by mass of a solvent. The flux of the Executed Example 18 indicated 11.2 degrees of the contact angle and 1.96 seconds of the zero-cross time and both obtained results were excellent.

The flux of the Comparative Example 1 contained 5% by mass of an organic acid, 14% by mass of amino terminal PEG/PPG copolymer as the amine, 30% by mass of polyoxyethylene polyoxypropylene ethylenediamine as a surfactant, 20% by mass of polyethylene glycol as a base agent and 31% by mass of a solvent. The flux of the Comparison Example 1 indicated 15.1 degrees of the contact angle, which was an excellent result, but indicated 5.23 seconds of the zero-cross time, which were slow wet-spreading properties.

The flux of the Comparative Example 2 contained 20% by mass of an organic acid, 20% by mass of N,N,N',N'',N''-pentakis(2-hydrokypropyl)diethylenetriamine as the amine, 20% by mass of polyoxyethylene alkylamide as a surfactant, 12% by mass of polyethylene glycol as a base agent and 28% by mass of a solvent. The flux of the Comparison Example 2 indicated 9.0 degrees of the contact angle, which was too wetly spread-out, and indicated 2.33 seconds of the zero-cross time, which were slow wet-spreading properties.

The flux of the Comparative Example 3 contained 20% by mass of an organic acid, 10% by mass of N,N,N',N'',N''-pentakis(2-hydrokypropyl)diethylenetriamine as the amine, 10% by mass of amino terminal PEG/PPG copolymer as the amine, 20% by mass of polyoxyethylene alkylamine as a surfactant, 10% by mass of polyethylene glycol as a base agent and 30% by mass of a solvent. The flux of the Comparison Example 3 indicated 1.68 seconds of the zero-cross time, which was an excellent result, but indicated 10.2 degrees of the contact angle, which was too wetly spread-out.

The flux of the Comparative Example 4 contained 7% by mass of an organic acid, 11% by mass of amino terminal PEG/PPG copolymer as the amine, 13% by mass of polyethylene glycol as a base agent and 69% by mass of a solvent. The flux of the Comparison Example 4 indicated 26.7 degrees of the contact angle, which was wetly spread-out to an insufficient degree, and indicated 2.76 seconds of the zero-cross time, which were slow wet-spreading properties.

The flux of the Comparative Example 5 contained 10% by mass of an organic acid, 3% by mass of imidazole as an amine, 10% by mass of amino terminal PEG/PPG copolymer as the amine, 30% by mass of polyethylene glycol as a base agent and 47% by mass of a solvent. The flux of the Comparison Example 5 indicated 1.10 seconds of the zero-cross time, which was an excellent result, but indicated 17.2 degrees of the contact angle, which was wetly spread-out to an insufficient degree.

The flux of the Comparative Example 6 contained 10% by mass of an organic acid, 1% by mass of imidazole as an amine, 10% by mass of N,N,N',N'-tetrakis(2-hydroxypropyl)ethylenediamine as the amine, 10% by mass of polyoxyethylene alkylamine as a surfactant, 30% by mass of polyethylene glycol as a base agent and 39% by mass of a solvent. The flux of the Comparison Example 6 indicated 11.5 degrees of the contact angle, which was an excellent result, but indicated 2.40 seconds of the zero-cross time, which were slow wet-spreading properties.

The flux of the Comparative Example 7 contained 7% by mass of an organic acid, 3% by mass of imidazole as an amine, 11% by mass of amino terminal PEG/PPG copolymer as the amine, 13% by mass of polyethylene glycol as a base agent and 66% by mass of a solvent. The flux of the Comparison Example 7 indicated 1.10 seconds of the zero-cross time, which was an excellent result, but indicated 27.0 degrees of the contact angle which was wetly spread-out to an insufficient degree.

In the Executed Examples 1 through 18, all of the fluxes contained 5% by mass or more and 30% by mass or less of the organic acid. The fluxes of all of the Executed Examples indicated excellent results in the validations of the contact angle and zero-cross time. Accordingly, it has been preferable that the component of the organic acid is of 5% by mass or more and 30% by mass or less. Although the glutaric acid was used as the organic acid in the Executed Examples, all sorts of the organic acid may be used. In other Executed Examples, the flux containing 5% by mass or more and 30% by mass or less of the organic acid including, other than the glutaric acid, tartaric acid, phenyl succinic acid, succinic acid, malonic acid, adipic acid, azelaic acid, glycolic acid, diglycolic acid, thioglycolic acid, thiodiglycolic acid, propionic acid, malic acid, dimer acid, hydrogenated dimer acid, trimer acid or the like also indicated excellent results in the validations of the contact angle and zero-cross time.

Although the fluxes of the Executed Example 7 and the Comparison Example 6 contained the similar components, the zero-cross time in the Executed Example 7 indicated 1.08 seconds, which was an excellent result, whereas the zero-cross time in the Comparison Example 6 indicated 2.40 seconds which was slower than that of Executed Example 7. This is because percentages of the amines in the fluxes are different in the Executed Example 7 and the Comparison Example 6. From the results of the Executed Example 7 and the Comparison Example 6, it may be determined that the contained percentages of the amines affect the zero-cross time of the flux. The flux of the Executed Example 7 contained 13% by mass of the amine but the flux of the Comparison Example 6 contained 11% by mass of the amine. All of the fluxes of the Executed Examples 1 through 18 contained 13% by mass or more and 40% by mass or less of the amine. Accordingly, it has been preferable that a percentage of the amines in the flux is of 13% by mass or more and 40% by mass or less.

Although combinations of amines contained in the fluxes were different in the Executed Examples 1 through 18, all of the fluxes indicated excellent results in the validations of the contact angle and zero-cross time. Accordingly, sorts of the amines contained in the flux do not affect the validations of the contact angle and zero-cross time. It may be determined that any sorts of the amine are preferably contained in the flux. The fluxes containing 13% by mass or more and 40% by mass or less of the amines, which have been described above from line 18 of page 5 to line 2 of page 7, indicated excellent results in the validations of the contact angle and zero-cross time. Accordingly, the amine preferably has 700 or less of a molecular weight and it has, more preferably, 600 or less of the molecular weight. The amine more preferably includes at least any one selected from a group consisting of imidazoles, aliphatic amine, aromatic amine, aminoalcohol, polyoxyalkylene alkylamine, terminal amine polyoxyalkylene, amine halogenated hydroacid salt, and polyoxyalkylene amine.

Although the fluxes of the Executed Example 13 and the Executed Example 15 contained the similar components, the contact angle in the Executed Example 13 indicated 11.0 degrees whereas the contact angle in the executed Example 15 indicated 16.0 degrees which was larger than that of Executed Example 13. This is because percentages of the polyoxyethylene alkylamine as the surfactant are different in the Executed Examples 13 and 15 and the percentage of the surfactant in the Executed Example 15 is smaller than that of the Executed Example 13. Therefore, it is understood that the percentage of the contained surfactant affects the contact angle between the flux and the resist substrate.

The fluxes in the Comparison Examples 4, 5 and 7 respectively indicated 26.7 degrees, 17.2 degrees and 27.0 degrees of the contact angle, which were wetly spread-out to an insufficient degree. This is because these fluxes do not contain any surfactant.

Although the fluxes of the Executed Example 8 and the comparison Example 3 contained the similar surfactant, these contained percentages thereof were different from each other. The flux in the Executed Example 8 indicated 12.0 degrees of the contact angle, which was an excellent result, whereas the flux in the Comparison Example 3 indicated 10.2 degrees of the contact angle, which was too wetly spread-out. Further, the flux in the comparison Example 2 contained the same percentage of the surfactant as that of surfactant in the flux in the Comparison Example 3. The flux in the comparison Example 2 indicated 9.0 degrees of the contact angle, which was also too wetly spread-out. Form the results of the Executed Example 8 and the Comparison Examples 3 through 5 and 7 and a fact such that all of the fluxes in the Executed Examples contained 1% by mass or more and 15% by mass or less of a surfactant, it has been preferable that a percentage of the contained surfactant is of 1% by mass or more and 15% by mass or less.

The fluxes in the Executed Examples 11 and 12 contained different sorts of surfactant but they indicated excellent large contact angles. The fluxes in all of the Executed Examples contained 1% by mass or more and 15% by mass or less of any one of polyoxyethylene polyoxypropylene ethylenediamine and polyoxyethylene alkylamine as the surfactant and these fluxes indicated excellent large contact angles. Further, the fluxes containing 1% by mass or more and 15% by mass or less of a single sort or plural sorts of the surfactants, which have been described above in lines 3 through 11 of page 7, also indicated excellent large contact angles.

As a result thereof, it may be determined that when any sort(s) of the surfactant is (are) contained in the flux, the flux may indicate excellent large contact angle. Particularly, it has been preferable that the surfactant having more than 700 of the molecular weight is used. It has been preferable that the flux contains at least any one of polyoxyalkylene alkylamine surfactant, polyoxyalkylene alkylenediamine surfactant, and polyoxyalkylene alkylenetriamine surfactant.

In the Executed Examples 1 through 18, all of the fluxes contained 10% by mass or more and 30% by mass or less of polyethylene glycol as the base agent. The fluxes of all of the Executed Examples indicated excellent results in the validations of the contact angle and zero-cross time. Accordingly, it has been preferable that the component of the base agent is of 10% by mass or more and 30% by mass or less. The base agent is not limited to polyethylene glycol. For example, the fluxes contained 10% by mass or more and 30% by mass or less of PEG/PPG copolymer, polyoxyethylene alkylester, polyoxyethylene tallow ester as the base agent indicated excellent results in the validations of the contact angle and zero-cross time.

In the Executed Examples 1 through 18, all of the fluxes contained 10% by mass or more and 40% by mass or less of the solvent. The fluxes of all of the Executed Examples indicated excellent results in the validations of the contact angle and zero-cross time. Accordingly, it has been preferable that the component of the solvent is of 10% by mass or more and 40% by mass or less. Although hexyl diglycol was used as the solvent in the Executed Examples, the solvent is not limited thereto. The fluxes contained 10% by mass or more and 40% by mass or less of the solvent described above in lines 14 through 23 of page 7 indicated excellent results in the validations of the contact angle and zero-cross time.

The flux in the Executed Example 9 contained trans-2,3-dibromo-2-butene-1, 4-diol as the halogen and the flux indicated excellent results in the validations of the contact angle and zero-cross time. Accordingly, it has been preferable that the component of the halogen is of 0% by mass or more and 5% by mass or less. The halogen is not limited to trans-2,3-dibromo-2-butene-1, 4-diol. The flux contained 0% by mass or more and 5% by mass or less of 2,3-dibromo-1,4-butanediol, 2,3-dibromo-1-propanol, 2,3-dichloro-1-propanol, 2,2,2-tribromoethanol, or 1,1,2,2-tetrabromoethane as the halogen also indicated excellent results in the validations of the contact angle and zero-cross time. Further, the flux contained any one of a coloring agent such as a coloring matter, a pigment, and a dye, and an antifoam or a combination thereof indicated excellent results in the validations of the contact angle and zero-cross time.

When using the fluxes indicated excellent results in the above-mentioned validations of the contact angle and zero-cross time were used for mounting the metal core columns on the electrodes of the substrate, it was possible to mount the metal core columns without falling down or deviating to form the solder bumps at desired positions.

A percentage of each composition of flux is not limited to the above-mentioned ones shown the above Executed Examples. Although the metal core columns in each of which metal is a core have been used in the Executed Examples, this invention is not limited thereto. The columns in each of which insulating material such as resin is a core may be used in this invention. Since self-alignment was easier to act on solder balls or metal core balls in each of which metal such as Cu was a core than the columns, the solder balls or metal core balls could be stably mounted on the electrodes without missing the balls.

The present invention is applicable to a flux used for mounting metal core columns in each of which metal is a core, metal core balls in each of which metal is a core, or solder balls on electrodes.

It should be understood by those skilled in the art that various modifications, combinations, sub-combinations and alterations may occur depending on design requirements and other factors insofar as they are within the scope of the appended claims or the equivalents thereof.

What is claimed is:

1. A flux containing:
5% by mass or more and 30% by mass or less of an organic acid, 13% by mass or more and 40% by mass or less of an amine, 1% by mass or more and 15% by mass or less of a surfactant, 10% by mass or more and 30% by mass or less of a base agent, and 10% by mass or more and 40% by mass or less of a solvent, wherein the amine has 700 or less of a molecular weight, the surfactant has more than 700 of the molecular weight, and the surfactant is any one selected from a group consisting of polyoxyalkylene alkylamine surfactant, polyoxyalkylene alkylenediamine surfactant, and polyoxyalkylene alkylenetriamine surfactant;
11.0 degrees or more and 17.0 degrees or less of a contact angle between the flux and a resist substrate on which the flux has been printed to have 1.0 mm of a diameter and 0.15 mm of a thickness when heating the resist substrate at 150 degrees C. for 30 seconds and cooling the resist substrate to a room temperature; and
more than zero seconds and not more than 2.0 seconds of a zero-cross time when heating a Cu plate at 150 degrees C. in a thermostat oven for 12 hours, applying the flux onto the baked Cu plate, and dipping the baked Cu plate onto which the flux has been applied into a Sn-3.0Ag-0.5Cu alloy at a dipping speed of 15 mm/sec and by 2.0 mm of a dipped depth.

2. The flux according to claim 1, wherein the amine is at least any one selected from a group consisting of imidazoles, aliphatic amine, aromatic amine, aminoalcohol, polyoxyalkylene alkylamine, terminal amine polyoxyalkylene, amine halogenated hydroacid salt, and polyoxyalkylene amine.

* * * * *